(12) United States Patent
Gmuender et al.

(10) Patent No.: US 8,015,169 B1
(45) Date of Patent: Sep. 6, 2011

(54) METHOD AND AN APPARATUS TO REQUEST WEB PAGES AND CONTENT RATING INFORMATION THEREOF

(75) Inventors: John E. Gmuender, San Jose, CA (US); Alex M. Dubrovsky, San Mateo, CA (US); Nikolay V. Popov, Cupertino, CA (US); Alexander Shor, Sunnyvale, CA (US); Roman Yanovsky, Los Altos, CA (US); Shunhui Zhu, San Jose, CA (US); Boris Yanovsky, Saratoga, CA (US)

(73) Assignee: Sonicwall, Inc., San Jose, CA (US)

( * ) Notice: Subject to any disclaimer, the term of this patent is extended or adjusted under 35 U.S.C. 154(b) by 542 days.

(21) Appl. No.: 10/853,557

(22) Filed: May 24, 2004

(51) Int. Cl.
*G06F 7/00* (2006.01)
*G06F 17/30* (2006.01)
(52) U.S. Cl. .................... 707/706; 707/709; 707/736
(58) Field of Classification Search .................. 709/225, 709/229; 707/706, 709, 736
See application file for complete search history.

(56) References Cited

U.S. PATENT DOCUMENTS

| | | | | |
|---|---|---|---|---|
| 6,003,030 A * | 12/1999 | Kenner et al. | ................... | 707/10 |
| 6,061,692 A | 5/2000 | Thomas et al. | | |
| 6,144,996 A * | 11/2000 | Starnes et al. | ................ | 709/217 |
| 6,502,125 B1 | 12/2002 | Kenner et al. | | |
| 6,772,214 B1 * | 8/2004 | McClain et al. | ............. | 709/229 |
| 6,829,653 B1 | 12/2004 | Tout | | |
| 6,981,029 B1 * | 12/2005 | Menditto et al. | ............. | 709/217 |
| 7,089,246 B1 * | 8/2006 | O'Laughlen | .................... | 707/10 |
| 2001/0047429 A1 | 11/2001 | Seng et al. | | |
| 2002/0073167 A1 * | 6/2002 | Powell et al. | ................. | 709/217 |
| 2002/0073335 A1 | 6/2002 | Shuster | | |
| 2006/0168088 A1 | 7/2006 | Leighton et al. | | |
| 2007/0239865 A1 | 10/2007 | Tout | | |

OTHER PUBLICATIONS

"Websense Enterprise Product Overview", Internet Filter Websense Enterprise, http://www.websense.com/products/about/Enterprise/, 4 pages.
"Cerberian Web Filter", http://products.enterpriseitplanet.com/security/fm/1062023449.html, Enterprise IT Planet Product Guide, 5 pages.
P. Mockapetris, "Domain Names—Implementation and Specification", Network Working Group, Nov. 1987, 55 pages.
P. Mackapetris, "Domain Names—Concepts and Facilities", Network Working Group, Nov. 1987, 55 pages.
Office Action dated Nov. 15, 2006 for U.S. Appl. No. 10/853,447, filed May 24, 2004, 15 pages.
Office Action dated Aug. 23, 2007 for U.S. Appl. No. 10/853,447, filed May 24, 2004, 16 pages.
Office Action dated Jan. 10, 2008 for U.S. Appl. No. 10/853,447, filed May 24, 2004, 15 pages.
Office Action dated Jun. 3, 2008 for U.S. Appl. No. 10/853,447, filed May 24, 2004, 16 pages.

(Continued)

*Primary Examiner* — Apu M Mofiz
*Assistant Examiner* — Jared M Bibbee
(74) *Attorney, Agent, or Firm* — Blakely, Sokoloff, Taylor & Zafman, LLP

(57) ABSTRACT

A method and an apparatus request web pages and content rating information thereof have been disclosed. In one embodiment, the method includes receiving a request from a user for a web page, retrieving content rating of the web page in response to the request, and fetching the web page substantially simultaneously with the retrieving of the content rating in response to the request. Other embodiments have been claimed and described.

29 Claims, 4 Drawing Sheets

OTHER PUBLICATIONS

Office Action dated Sep. 12, 2008 for U.S. Appl. No. 10/853,447, filed May 24, 2004, 18 pages.
Office Action dated Apr. 9, 2009 for U.S. Appl. No. 10/853,447, filed May 24, 2004, 19 pages.
Office Action dated Sep. 14, 2009 for U.S. Appl. No. 10/853,447, filed May 24, 2004, 18 pages.
Notice of Allowance mailed Mar. 25, 2010 for U.S. Appl. No. 10/853,447 filed May 24, 2004, 6 pages.
Supplemental Notice of Allowance mailed Apr. 22, 2010 for U.S. Appl. No. 10/853,447 filed May 24, 2004, 5 pages.
Supplemental Notice of Allowance mailed May 18, 2010 for U.S. Appl. No. 10/853,447 filed May 24, 2004, 5 pages.

* cited by examiner

METHOD AND AN APPARATUS TO REQUEST WEB PAGES AND CONTENT RATING INFORMATION THEREOF

FIELD OF INVENTION

The present invention relates to web pages, and more particularly, to requesting content rating information of web pages.

BACKGROUND

Today, various content filtering mechanisms are provided to entities to manage and/or control user access to the Internet via facilities provided by the entities. For example, a company typically implements some form of content filtering mechanism to control the use of the company's computers and/or servers to access the Internet. Access to content within certain predetermined categories using the company's computers and/or servers may not be allowed during some predetermined periods of time.

One conventional content filtering mechanism is described below. A typical content filtering client, which resides in a firewall device, sends a request for the content rating of a web page in response to each web page browsed. The content rating requests are routed to a separate content rating server. When the content rating server receives a request, the content rating server retrieves the content rating for that request from a database and sends the content rating to the content filtering client.

Based on the content rating retrieved, the content filtering client determines whether the user is allowed to access the web page. If the user is allowed, then a request is sent to get the web page from the host of the web page. Otherwise, no request is sent to the web page host. Thus, the content filtering client typically receives the content rating before requesting the web page. As a result, a delay in getting the content rating may increase the latency in delivering the web page to the user in some existing systems. Depending on how long it takes the content filtering client to get the content rating, the user may experience a noticeable delay in accessing the web page. As such, the communication time and frequency with the content rating server (e.g., proximity, server performance, etc.) affects the performance of this process, but such content rating servers are relatively expensive as compared to network bandwidth.

SUMMARY

The present invention includes a method and an apparatus to request web pages and content rating information thereof. In one embodiment, the method includes receiving a request from a user for a web page, retrieving content rating of the web page in response to the request, and fetching the web page substantially simultaneously with the retrieving of the content rating in response to the request.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to request web pages and content rating information thereof are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
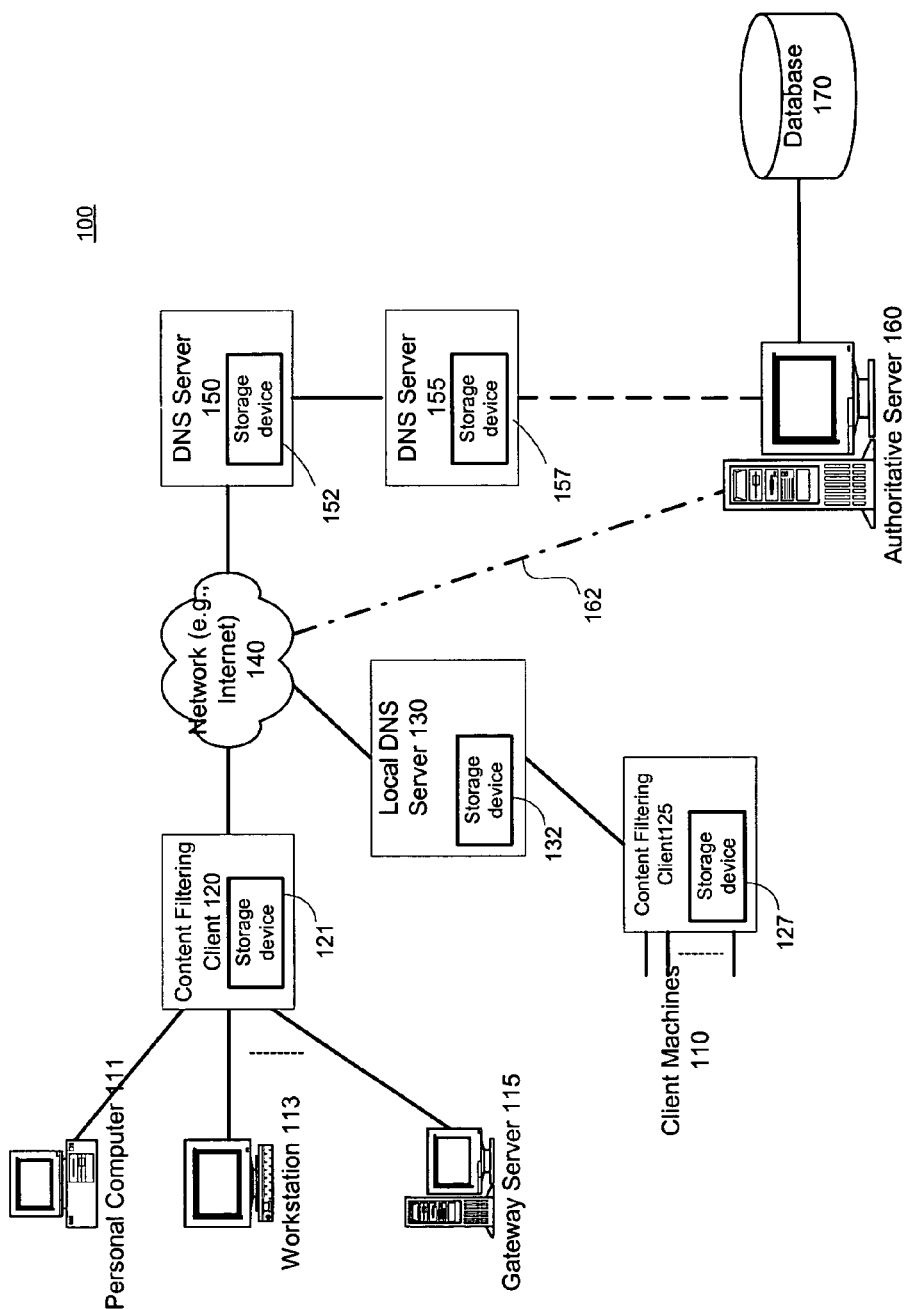
FIG. 1 illustrates a networked system usable with one embodiment of the invention.

FIG. 1 shows a networked system usable with one embodiment of the invention. The system 100 includes a first set of client machines, including, but not limited to, a personal computer 111, a workstation 113, and a gateway server 115; a first content filtering client 120; a second set of client machines 110; a second content filtering client 125; a local domain name service (DNS) server 130; a network 140; a DNS infrastructure, including, but not limited to, an authoritative server 160 and a database 170. In some embodiments, the DNS infrastructure further includes one or more DNS servers, such as a first DNS server 150 and a second DNS server 155 in FIG. 1.

Note that any or all of the components and the associated hardware illustrated in FIG. 1 may be used in various embodiments of the networked system 100. However, it should be appreciated that other configurations of the networked system 100 may include more or less devices than those shown in FIG. 1.

Referring to FIG. 1, the personal computer 111, the workstation 113, and the gateway server 115 are coupled to the first content filtering client 120. Likewise, the second set of client machines 110 is coupled to the second content filtering client 125. One should appreciate that the personal computer 111, the workstation 113, and the gateway server 115 are used as examples in FIG. 1 to illustrate the concept. Different types and/or combinations of client machines may be included in various embodiments.

Each of the content filtering clients 120 and 125 includes a local storage device 121 and 127, respectively. The local storage devices 121 and 127 may include any of various types of machine readable media, such as, for example, random access memory (RAM), dynamic random access memory (DRAM), flash memory, etc.

The content filtering clients 120 and 125 may be further coupled to the network 140, directly or indirectly. For example, the content filtering client 125 is coupled to the network 140 via the local DNS server 130 while the content filtering client 120 is directly coupled to the network 140. The network 140 may include a local area network (LAN), or a wide area network (WAN), etc. In one embodiment, the network 140 includes an Internet. The network 140 is further coupled to the authoritative server 160 in the DNS infrastructure. In some embodiments, the network 140 is coupled to the authoritative server 160 via one or more DNS servers (e.g., the DNS servers 150 and 155). Furthermore, the various components and the associated hardware shown in FIG. 1 may be coupled to each other via wired connections, wireless connections, or a combination of both.

One feature of the DNS infrastructure is its distributed nature. In one embodiment, the DNS infrastructure is a distributed database used by Transfer Control Protocol/Internet Protocol (TCP/IP) applications to map between hostnames and Internet Protocol (IP) addresses and to provide electronic mail routing information. Note that the hostname to IP address mapping may not be centrally located in a single database. Instead, each site (such as a company, campus, or department) maintains the site's own database of such mappings and runs one or more server programs on one of the DNS servers. Other systems communicably coupled to the DNS server via the Internet may query the DNS server for mapping information. A request sent to the DNS infrastructure for mapping information is hereinafter referred to as a standard DNS request. Likewise, a response to a standard DNS request is herein referred to as a standard DNS response.

In addition to the distributed nature of the DNS infrastructure, another feature of the DNS infrastructure involves the ability of a DNS server to locally store or to cache certain predetermined information. For example, each of the DNS servers 150 and 155 in FIG. 1 includes a local storage device 152 and 157, respectively. The local storage devices 152 and 157 may include any of various types of memory devices, such as, for example, random access memory (RAM), dynamic random access memory (DRAM), flash memory, etc. A DNS server may store responses routed through the DNS server in the local storage device within the DNS server. Using the locally stored responses, the DNS server may be able to respond to subsequent requests for the same information. The responses stored in the DNS server may be maintained for a predetermined period of time. In one embodiment, the predetermined period is specified by a time-to-live (TTL) parameter in the responses. By locally storing the responses in the storage device of the DNS server, the time for responding to the subsequent requests can be reduced because the further requests are not routed to additional servers. Likewise, the volume of network traffic for transmitting DNS responses may also be reduced.

Instead of coupling to the authoritative server 160 via the DNS infrastructure, the network 140 is directly connected to the authoritative server 160 in some embodiments. For example, the dotted line 162 in FIG. 1 represents such a direct connection. The authoritative server 160 is further coupled to a database 170, which the authoritative server 160 may access to retrieve content rating information of web pages. In one embodiment, the database 170 is maintained by a content filtering service provider. Web pages may be evaluated automatically or manually to generate content rating of the web pages. The content filtering service provider may update the database 170 with the content rating generated.

Figure 2:
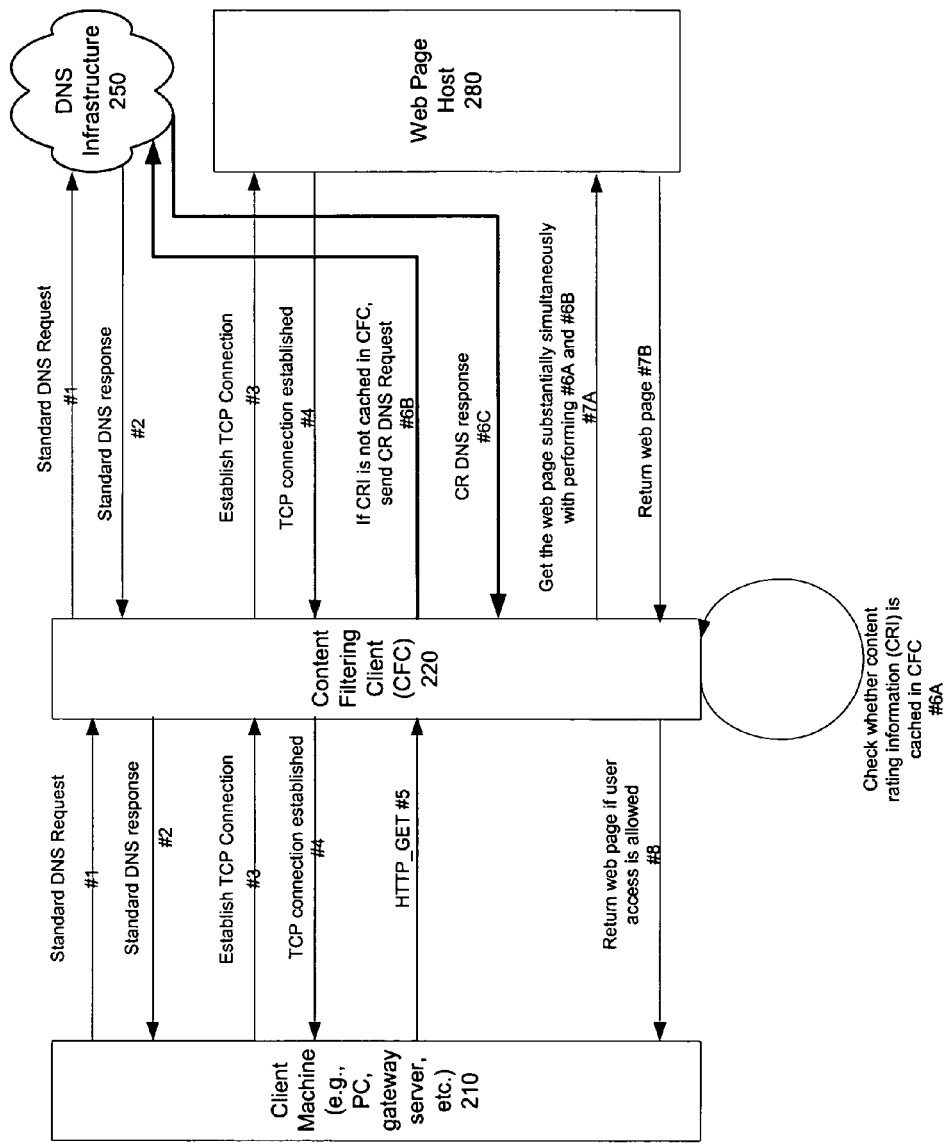
FIG. 2 illustrates a call diagram of one embodiment of a process for requesting web pages and content rating information of the web pages in response to a user request.

FIG. 2 illustrates a call diagram of one embodiment of a process to request web pages and content rating thereof. Some exemplary requests and responses between a client machine 210, a content filtering client (CFC) 220, a web page host 280, and a DNS infrastructure 250 are shown in FIG. 2 for the purpose of illustrating the concept. However, some embodiments of the present invention may include more or less requests and/or responses than those illustrated in FIG. 2. Furthermore, although the embodiment shown in FIG. 5 uses a proxy for content filtering, one should appreciate that the technique disclosed is also applicable to other types of content filtering, such as Stateful Packet Inspection (SPI). Referring to FIG. 2, the client machine 210 may include the personal computer 111, the workstation 113, and the gateway server 115 shown in FIG. 1. The CFC 220 may be run on any network access device, such as modems, routers, firewalls, etc. The DNS infrastructure 250 may include any number of DNS servers (e.g., the DNS servers 150 and 155 in FIG. 1) and an authoritative server (e.g., the authoritative server 160 in FIG. 1).

Referring to FIG. 2, the client machine 210 sends a standard DNS request #1 to the CFC 220 to request the IP address of a web page. The CFC 220 forwards the standard DNS request #1 to the DNS infrastructure 250. In response to the standard DNS request #1, the DNS infrastructure 250 sends a standard DNS response #2 containing the IP address of the web page to the CFC 220. Then the CFC 220 forwards the standard DNS response #2 to the client machine 210.

Using the IP address of the web page, the client machine 210 establishes a Transfer Control Protocol (TCP) connection #3 with the CFC 220. Likewise, the CFC 220 also establishes a TCP connection #3 with the web page host 280 using the IP address. When the TCP connection #3 is established, the web page host 280 sends a confirmation #4 to the CFC 220 to indicate so. Likewise, the CFC 220 sends a confirmation #4 to the client machine 210.

Via the TCP connection #3, the client machine 210 sends a request #5 for the web page to the CFC 220. In one embodiment, the client machine 210 uses the Hypertext Transfer Protocol (HTTP). The request #5 may include one or more HTTP commands, such as HTTP_GET, HTTP_POST, HTTP_INFO, etc. In response to the request #5, the CFC 220 checks whether the content rating information (CRI) of the web page is locally stored in the CFC 220 (process #6A). Based on the CRI, the CFC 220 may determine whether the client machine 210 is allowed to access the web page. If the CRI is not available in the CFC 220, then the CFC 220 requests the CRI from the DNS infrastructure 250. To request the CRI, the CFC 220 may send a Content Rating (CR) DNS request #6B to the DNS infrastructure 250. Unlike the standard DNS requests, which are sent to query mapping information of web pages, the CR DNS requests are sent to request CRI of web pages. Details of the CR DNS requests are discussed below with reference to FIG. 3. In response to the CR DNS request #6B, the DNS infrastructure 250 sends a CR DNS response #6C including the CRI to the CFC 220. The DNS response #6C may be routed through any DNS servers that the DNS request #6B has passed through. Furthermore, these DNS servers may store a copy of the CR DNS response #6C locally before forwarding the CR DNS response #6C. In one embodiment, the CRI in the CR DNS response #6C is encrypted for security.

Unlike the existing approach, the CFC 220 sends a request #7A for the web page to the web page host 280 prior to getting the CRI of the web page. Since the CFC 220 does not wait for checking the CRI before requesting the web page, the potential delay in forwarding the web page to the client machine 210 is reduced. In one embodiment, the CFC 220 sends the CR DNS request #6B and the request for the web page #7A substantially simultaneously or substantially in parallel. Alternatively, the CFC 220 may send the request for the web page #7A and check whether the CRI is locally stored in the CFC 220 (process #6A) substantially simultaneously or substantially in parallel.

In response to the request #7A for the web page, the web page host 280 sends the web page #7B to the CFC 220. If the CRI arrives at the CFC 220 before the web page does, then the CFC 220 uses the CRI to determine whether the client machine 210 is allowed to access the web page. If access is allowed, the CFC 220 forwards the web page #8 to the user. Otherwise, the CFC 220 does not forward the web page to the user. Instead, the CFC 220 may send a predetermined page or a notice to inform the client machine 210 that access to the requested web page is not allowed.

However, if the web page arrives at the CFC 220 before the CRI does, then the CFC 220 may hold the web page and wait for the CRI for a predetermined period of time. When the predetermined period expires and the CRI still has not arrived, the CFC 220 may nevertheless forward the web page #8 to the client machine 210. Otherwise, if the CRI arrives before the predetermined period expires, the CFC 220 uses the CRI to determine whether the client machine 210 is allowed to access the web page. If access is allowed, the CFC 220 forwards the web page to the user (#8). Otherwise, the CFC 220 does not forward the web page to the user. Instead, the CFC 220 may send a predetermined page or a notice to inform the client machine 210 that access to the requested web page is not allowed. In some embodiments, the CRI arrived is encrypted, and thus, the CFC 220 decrypts the CRI.

Figure 3:
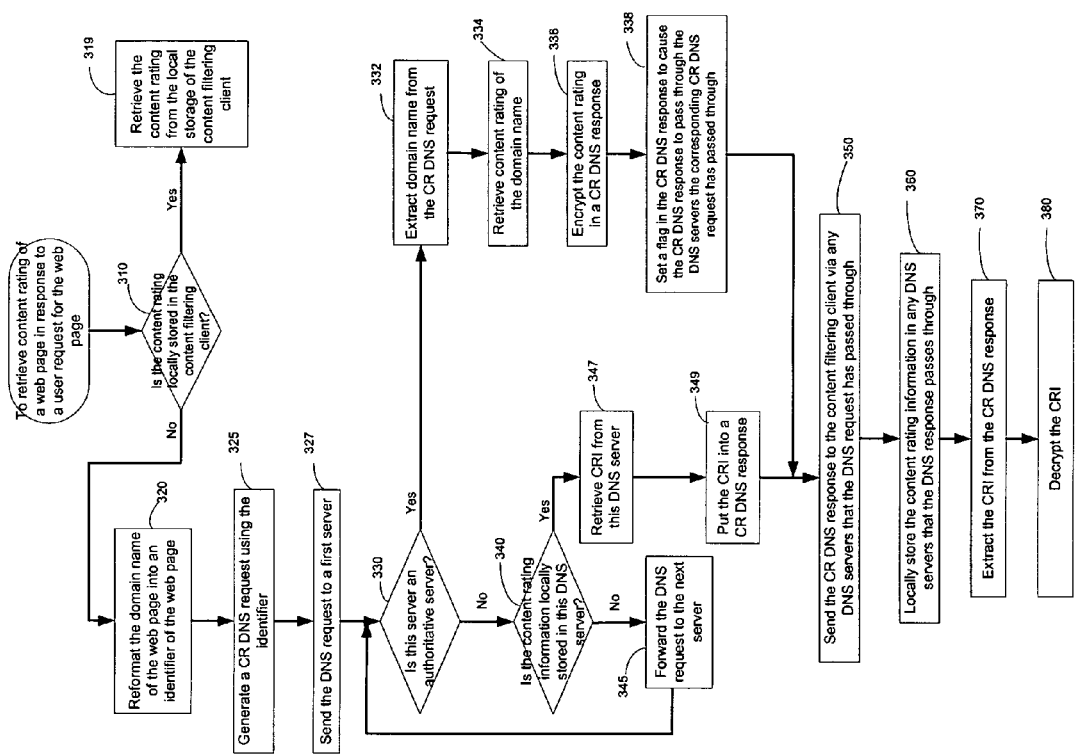
FIG. 3 illustrates a flow diagram of one embodiment of a process for getting content rating information of a web page.

FIG. 3 illustrates a flow diagram of one embodiment of a process for getting content rating information (CRI) of a web page in response to a user request for the web page. The process is performed by processing logic that may comprise hardware (e.g., circuitry, dedicated logic, etc.), software (such as is run on a general-purpose computer system or a dedicated machine), or a combination of both.

Referring to FIG. 3, processing logic determines whether the CRI of the web page is locally stored in the content filtering client (CFC) (processing block 310). For example, the CFC may include a local storage device (e.g., the local storage device 121 in the content filtering client 120 in FIG. 1) to store the CRI for a predetermined period of time. In some embodiments, a flag or an indicator (e.g., a time-to-live (TTL) parameter) may be stored with the CRI to indicate when the CRI expires. If the CRI is locally stored in the CFC, processing logic retrieves the CRI from the local storage device of the CFC (processing block 319). In some embodiments, the locally stored CRI is encrypted. Therefore, processing logic may decrypt the retrieved CRI. If the CRI is not locally stored in the content filtering client, then processing logic may perform additional operations to get the CRI as described below.

In one embodiment, if the CRI is not locally stored in the CFC, processing logic sends a request for the CRI to a DNS infrastructure (e.g., the DNS infrastructure 250 in FIG. 2). The request may be referred to as a CR DNS request. Processing logic may reformat the domain name of the web page into an identifier of the web page (processing block 320). For example, a domain name, "www.xyz.com" supplied from a client application via a HTTP_GET, may be converted into another format, such as "www.xyz.com.PORT/PROTOCOL/WEBSERVER IP.webcfs.com". Then processing logic generates a CR DNS request including the identifier of the web page (processing block 325). DNS servers may distinguish the CR DNS request from standard DNS requests by the identifier. Processing logic sends the CR DNS request generated to a first server (processing block 327).

Then processing logic determines whether this server is an authoritative server (e.g., the authoritative server 160 in FIG. 1). If this is an authoritative server, processing logic extracts the domain name or the Uniform Resource Locator (URL) of the web page from the identifier in the CR DNS request (processing block 332). Processing logic retrieves the CRI using the domain name or URL from a database coupled to the authoritative server (processing block 334). Processing logic then encrypts the CRI into a CR DNS response (processing block 336). Furthermore, processing logic may set a flag or write in a predetermined field in the CR DNS response to cause the CR DNS response to pass through the same set of DNS servers the CR DNS request has passed through, if any (processing block 338). In some embodiments, the DNS servers locally store or cache the CR DNS response as the CR DNS response passes through the DNS servers. Then processing logic transitions to processing block 350.

Otherwise, if this is not an authoritative server, this server is a DNS server (e.g., the DNS servers 150 and 155 in FIG. 1). Processing logic checks whether the CRI is locally stored in the DNS server (processing block 340). The locally stored CRI may be encrypted to protect the CRI. If the CRI is not locally stored in the DNS server, processing logic forwards the DNS request to a next server coupled to this DNS server (processing block 345) and repeats processing block 330. If the CRI is locally stored in the DNS server, processing logic retrieves the CRI from this DNS server (processing block 347) and puts the CRI into a CR DNS response (processing block 349). Then processing logic transitions to processing block 350.

Processing logic sends the CR DNS response to the content filtering client (processing block 350). As mentioned above, processing logic may set a flag or write in a field of the CR DNS response to send the CR DNS response via any DNS servers that the DNS request has passed through. Processing logic may also store the CRI in the CR DNS response, or the entire CR DNS response, in one or more local storage devices (e.g., the storage devices 152 and 157) of any DNS servers that the DNS response passes through (processing block 360). In some embodiments, the CRI is maintained in the local storage of the DNS servers for a predetermined period specified by a time-to-live (TTL) parameter in the CR DNS response. By locally storing CRI, the DNS servers can respond to subsequent CR DNS requests for the stored CRI without forwarding the subsequent CR DNS requests to another server. Therefore, the overall network traffic for transmitting CR DNS requests and CR DNS responses may be reduced. Likewise, the latency in responding to the subsequent CR DNS requests may be reduced.

Referring back to FIG. 3, when a CR DNS response arrives at the content filtering client, processing logic extracts the CRI from the CR DNS response (processing block 370). In some embodiments, the CRI has been encrypted, and thus, processing logic decrypts the CRI (processing block 380). Based on the CRI processing logic determines whether the user is allowed to access the web page requested.

The technique disclosed above takes advantage of the distributed nature of the DNS infrastructure to improve the efficiency in getting the CM because processing logic may not have to access the authoritative server and the database every time the CRI is requested. As discussed above, the CRI may be available in the local storage of one or more of the DNS servers, which the CR DNS response containing the CRI has passed through before, and thus, the overall traffic for getting CRI may be reduced. Furthermore, the above technique allows processing logic to leverage an existing architecture (e.g., the existing DNS infrastructure) to get CRI as well as to store CRI. Hence, the overall cost of the content filtering mechanism can be reduced.

Figure 4:
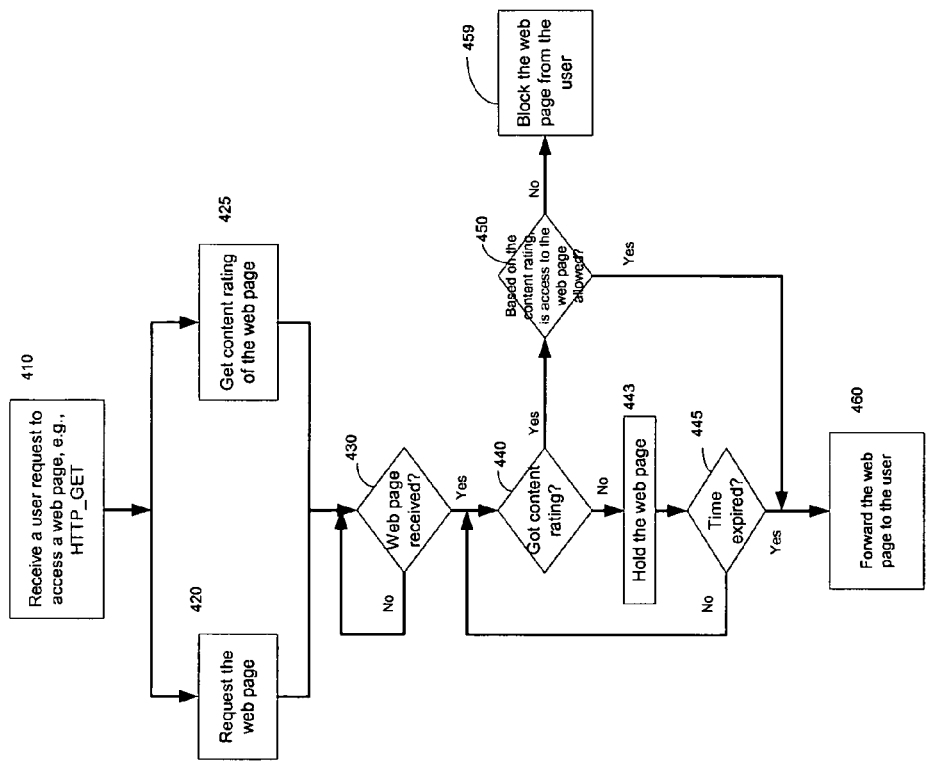
FIG. 4 illustrates a flow diagram of one embodiment of a process for requesting a web page and content rating information of the web page substantially in parallel.

FIG. 4 illustrates a flow diagram of one embodiment of a process for requesting a web page and content rating information thereof. The process is performed by processing logic that may comprise hardware (e.g., circuitry, dedicated logic, etc.), software (such as is run on a general-purpose computer system or a dedicated machine), or a combination of both.

Referring to FIG. 4, processing logic receives a user request to access a web page (processing block 410). The request may include a HTTP_GET. In response to the user request, processing logic requests the web page from a web page host (processing block 420) and gets the CRI of the web page (processing block 425) substantially in parallel or substantially simultaneously. One embodiment of a process for getting the CRI of the web page has been discussed in detail above with reference to FIG. 3.

Processing logic then checks whether the web page has arrived (processing block 430). If not, processing logic stays in processing block 430 until the web page arrives. In some embodiments, processing logic may time-out and send an error message to the user if the web page fails to arrive within a predetermined period of time.

When the web page has arrived, processing logic checks whether the CRI has also arrived (processing block 440). If the CRI has arrived, processing logic determines whether the user is allowed to access the web page using the CRI (processing block 450). Processing logic forwards the web page to the user if user access to the web page is allowed (processing block 460). If access is not allowed, processing logic blocks the web page from the user (processing block 459). In some embodiments, processing logic may send a notification or a blocked content page to inform the user that access is not allowed.

Referring back to processing block 440, if the CRI has not arrived yet, processing logic may hold the web page (processing block 443) and check whether a predetermined period of time has expired (processing block 445). If the predetermined period of time has not expired, processing logic may repeat processing block 440. Otherwise, processing logic may go ahead to forward the web page to the user (processing block 460).

Independent of leveraging the DNS infrastructure to transmit CRI, the technique of requesting the web page and the CRI substantially in parallel provides the advantage of reducing the potential latency due to the retrieval of the CRI. Note that the technique of requesting the web page and the CRI substantially in parallel may be applicable to systems having various configurations to transmit CRI (e.g., systems leveraging DNS infrastructure, systems having separate dedicated servers and/or network to transmit CRI, etc.). Unlike the conventional approach, in which the web page request is not sent until it is determined whether the user is allowed to access the web page, the technique discussed above sends the web page request before receiving the CRI. Therefore, the technique discussed above may reduce the latency in delivering the web page to the user due to the retrieval of the CRI and/or determination of whether user access is allowed. By combining the technique of requesting web page and CRI substantially in parallel with the technique of leveraging the DNS infrastructure to transmit CRI, the latency in transmitting the CRI via the DNS infrastructure may be reduced.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:
1. A method comprising:
receiving a request from a user for a web page;
retrieving content rating of the web page in response to the request;
fetching the web page substantially simultaneously with the retrieving of the content rating in response to the request;
receiving the web page;
holding the web page until the content rating of the web page has been retrieved or a predetermined time period for fetching the content rating has expired;
blocking the user from accessing the web page and causing an error message to be presented to the user via a display device if the content rating of the web page is in at least one of a set of one or more predetermined categories;

forwarding the web page, without the content rating, to the user if the content rating has not been retrieved before the predetermined time period for fetching the content rating expires; and
causing the display device to render the web page forwarded to the user.

2. The method of claim 1, wherein retrieving the content rating comprises:
checking whether the content rating is locally stored in a storage device of a content filtering client; and
retrieving the content rating from the storage device if the content rating is locally stored in the storage device.

3. The method of claim 2, wherein retrieving the content rating further comprises sending a request for the content rating to a remote server if the content rating is not locally stored in the storage device.

4. The method of claim 3, wherein retrieving the content rating further comprises setting a content rating flag in the request for the content rating, which comprises a domain name service (DNS) request.

5. The method of claim 4, further comprising:
receiving the content rating from the remote server; and
decrypting the content rating.

6. The method of claim 1, wherein the request for the web page comprises an Hypertext Transfer Protocol (HTTP) request for the web page.

7. The method of claim 1, further comprising:
determining whether to forward the web page to the user based on the content rating if the content rating is retrieved within the predetermined period of time.

8. A physical machine accessible storage medium that provides instructions that, if executed by a processor, will cause the processor to perform operations comprising:
receiving a request from a user for a web page;
retrieving content rating of the web page in response to the request;
fetching the web page substantially simultaneously with the retrieving of the content rating in response to the request;
receiving the web page;
holding the web page until the content rating of the web page has been retrieved or a predetermined time period for fetching the content rating has expired;
blocking the user from accessing the web page and causing an error message to be presented to the user via a display device if the content rating of the web page is in at least one of a set of one or more predetermined categories;
forwarding the web page, without the content rating, to the user if the content rating has not been retrieved before the predetermined time period for fetching the content rating expires; and
causing the display device to render the web page forwarded to the user.

9. The physical machine accessible storage medium of claim 8, wherein the operations further comprise:
checking whether the content rating is locally stored in a storage device of a content filtering client; and
retrieving the content rating from the storage device if the content rating is locally stored in the storage device.

10. The physical machine accessible storage medium of claim 9, wherein retrieving the content rating further comprises sending a request for the content rating to a remote server if the content rating is not locally stored in the storage device.

11. The physical machine accessible storage medium of claim 10, wherein retrieving the content rating further comprises setting a content rating flag in the request for the content rating, which comprises a domain name service (DNS) request.

12. The physical machine accessible storage medium of claim 11, wherein the operations further comprise:
receiving the content rating from the remote server; and
decrypting the content rating.

13. The physical machine accessible storage medium of claim 8, wherein the request for the web page comprises an Hypertext Transfer Protocol (HTTP) request for the web page.

14. The physical machine accessible storage medium of claim 8, wherein the operations further comprise:
determining whether to forward the web page to the user based on the content rating if the content rating is retrieved within the predetermined period of time.

15. A system comprising:
a server; and
a content filtering client to be logically coupled between the server and a first set of one or more client applications, to get content rating of web pages requested by the client applications, to request the web pages substantially simultaneously with getting the content rating, to hold the web pages until the content rating has been retrieved or a predetermined time period for fetching the content rating has expired, to forward the web page, without the content rating, to the client applications if the content rating has not been retrieved before the predetermined time period for fetching the content rating expires, to cause a display device to present the web pages forwarded to users if the web pages are not in any of a set of one or more predetermined categories or if the content rating has not been retrieved before the predetermined time period for fetching the content rating expires, and to cause the display device to present an error message and to block the client applications from accessing the web pages if the content rating of the web pages is in at least one of the set of one or more predetermined categories.

16. The system of claim 15, wherein the content filtering client includes a first storage device, the content filtering client is operable to check whether the content rating is available in the first storage device and to retrieve the content rating from the first storage device if the content rating is available in the first storage device.

17. The system of claim 16, wherein the content filtering client is operable to send a request for content rating to the server if the content rating is not available in the first storage device.

18. The system of claim 17, wherein the server is coupled to a database and the server is operable to retrieve the content rating from the database to send to the content filtering client.

19. The system of claim 17, wherein the server comprises a second storage device and the server is operable to retrieve the content rating from the second storage device to send to the content filtering client.

20. The system of claim 19, wherein the server comprises a domain name service (DNS) server.

21. The system of claim 15, wherein the content filtering client comprises a processor to determine whether the client applications are allowed to access the web pages based on the content rating retrieved.

22. The system of claim 15, further comprising one or more client machines to run the client applications and the content filtering client.

23. The system of claim 15, further comprising:
a firewall to run the content filtering client; and one or more client machines to run the client applications, the firewall being coupled between the server and the one or more client machines.

24. A method comprising:

receiving a request for a web page from a client application;

overlapping the process of fetching the web page from a web page host with the process of retrieving from a server content rating information for that web page;

receiving the web page from the web page host;

holding the web page until the content rating information has been retrieved or a predetermined time period for fetching the content rating has expired;

determining whether to block access to the fetched web page based on the content rating information;

forwarding the web page, without the content rating, to the client application if the content rating has not been retrieved before the predetermined time period for fetching the content rating expires;

presenting the fetched web page via a display device in a client machine if the access to the fetched web page is not blocked or if the content rating information has not been retrieved before the predetermined time period for fetching the content rating expires; and presenting an error message via the display device if the access to the fetched web page is blocked.

25. A method comprising:

receiving a request from a web page from a client application;

forwarding the request for the web page to a web page host prior to determining whether access will be blocked based on content rating information;

requesting the content rating information for the web page from a server substantially simultaneously with the forwarding of the request for the web page;

receiving the web page from the web page host;

holding the web page until the content rating information has been received or a predetermined time period for fetching the content rating has expired;

receiving the content rating information from the server;

determining whether to block access to the web page based on the received content rating information;

forwarding the web page, without the content rating, to the user if the content rating has not been retrieved before the predetermined time period for fetching the content rating expires;

presenting the web page via a display device in a client machine if the access to the web page is not blocked or if the content rating information has not been retrieved before the predetermined time period for fetching the content rating expires; and presenting an error message via the display device if the access to the fetched web page is blocked.

26. The method of claim 25, further comprising receiving the web page prior to said determining.

27. An apparatus comprising:

a content filtering client, to be coupled between a client application and a server and web page hosts, to forward requests from the client application for web pages to at least one of the web page hosts prior to having content rating information for those web pages, to overlap retrieval from the server of the content rating information for those web pages with the fetch of those web pages, to hold the web pages until the content rating information of the web pages is retrieved or a predetermined time period for fetching the content rating has expired, to selectively block return of the web pages to the client application based on the retrieved content rating information, to forward the web pages, without the content rating, to the client application if the content rating has not been retrieved before the predetermined time period for fetching the content rating expires, to cause a display device in a client machine to present an error message if the access to the web pages is blocked, and to cause the display device to present the web pages forwarded if the access to the web pages is not blocked or if the content rating information has not been retrieved before the predetermined time period for fetching the content rating expires.

28. The apparatus of claim 27, further comprising a firewall, said firewall comprising said content filtering client.

29. The apparatus of claim 27, wherein the content filtering client includes a first storage device, the content filtering client is operable to check whether the content rating is available in the first storage device and to retrieve the content rating from the first storage device if the content rating is available in the first storage device.

* * * * *